(12) United States Patent
Bodnar et al.

(10) Patent No.: US 7,254,218 B1
(45) Date of Patent: Aug. 7, 2007

(54) METHOD AND APPARATUS TO PERMIT INTERJECTED MESSAGING IN A MULTIMEDIA MESSAGING SYSTEM

(75) Inventors: Eric O. Bodnar, Santa Cruz, CA (US); R. Travis Atkins, Santa Cruz, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 0 days.

(21) Appl. No.: 10/808,886

(22) Filed: Mar. 24, 2004

(51) Int. Cl.
*H04M 1/64* (2006.01)

(52) U.S. Cl. ............... 379/88.12; 379/88.13; 455/413; 455/417

(58) Field of Classification Search ............ 379/88.13, 379/218.01, 88.12; 455/413, 417
See application file for complete search history.

(56) References Cited

U.S. PATENT DOCUMENTS

| | | | | |
|---|---|---|---|---|
| 5,751,791 A | * | 5/1998 | Chen et al. ............... | 379/88.13 |
| 6,226,668 B1 | * | 5/2001 | Silverman ................ | 709/204 |
| 6,246,871 B1 | * | 6/2001 | Ala-Laurila ............. | 455/413 |
| 6,303,407 B1 | * | 10/2001 | Hotchkiss et al. ........ | 438/106 |
| 2002/0169687 A1 | * | 11/2002 | Perkowski ............... | 705/26 |
| 2004/0121761 A1 | * | 6/2004 | Tripathy et al. .......... | 455/413 |
| 2004/0123144 A1 | * | 6/2004 | Chan et al. ............. | 713/201 |
| 2005/0074112 A1 | * | 4/2005 | Timmins ............... | 379/218.01 |

* cited by examiner

*Primary Examiner*—Creighton Smith
*Assistant Examiner*—M. S. Alam Elahee
(74) *Attorney, Agent, or Firm*—Blakeley, Sokoloff, Taylor & Zafman, Inc.; Judith A. Szepesi

(57) ABSTRACT

A method and apparatus for handling misdirected responses in a multi-media messaging environment is described. The system includes a third party originator that sends data to a recipient bypassing an MMSC for message notification and retrieval. The present system handles the responses sent by the recipient to the MMSC, to prevent error messages and possible delivery failures.

4 Claims, 8 Drawing Sheets

METHOD AND APPARATUS TO PERMIT INTERJECTED MESSAGING IN A MULTIMEDIA MESSAGING SYSTEM

FIELD OF THE INVENTION

The present invention relates to multi-media messaging, and more particularly to handling interjected messages in a multi-media messaging system.

BACKGROUND

Multi-media messaging is becoming part of the wireless experience. Until recently, users could send SMS (short messaging system) messages to each other. These SMS messages were text-only. Recently, multi-media messaging has become available. The multi-media messages include images, audio, video, and other similar content. However, while text looks the same on all systems, the user's system significantly affects how a multi-media message is displayed. For example, a user with a small black and white display on his or her telephone should not receive a large format (640×480) color multi-media message. Similarly, a user with the most up-to-date rich color TFT screen would not be happy with a 40×80 black and white image.

In order to solve this problem a multi-media service center (MMSC) is used. The MMSC receives messages from a message generator and sends the formatted message on to a user's handset. However, the MMSC has a limited feature set.

SUMMARY OF THE INVENTION

A method and apparatus for handling misdirected responses in a multi-media messaging environment is described. The system includes a third party originator that sends data directly to a recipient bypassing the MMSC for message notification and retrieval. The present system handles the responses sent by the recipient to the MMSC, to prevent error messages and possible delivery failures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for enabling a third party to send a notification/message directly to a recipient, without using a multi-media messaging service center (MMSC). A third party originator (TPO) may be useful to enable certain providers to reach users, to enable multicast, or for other reasons.

Figure 1:
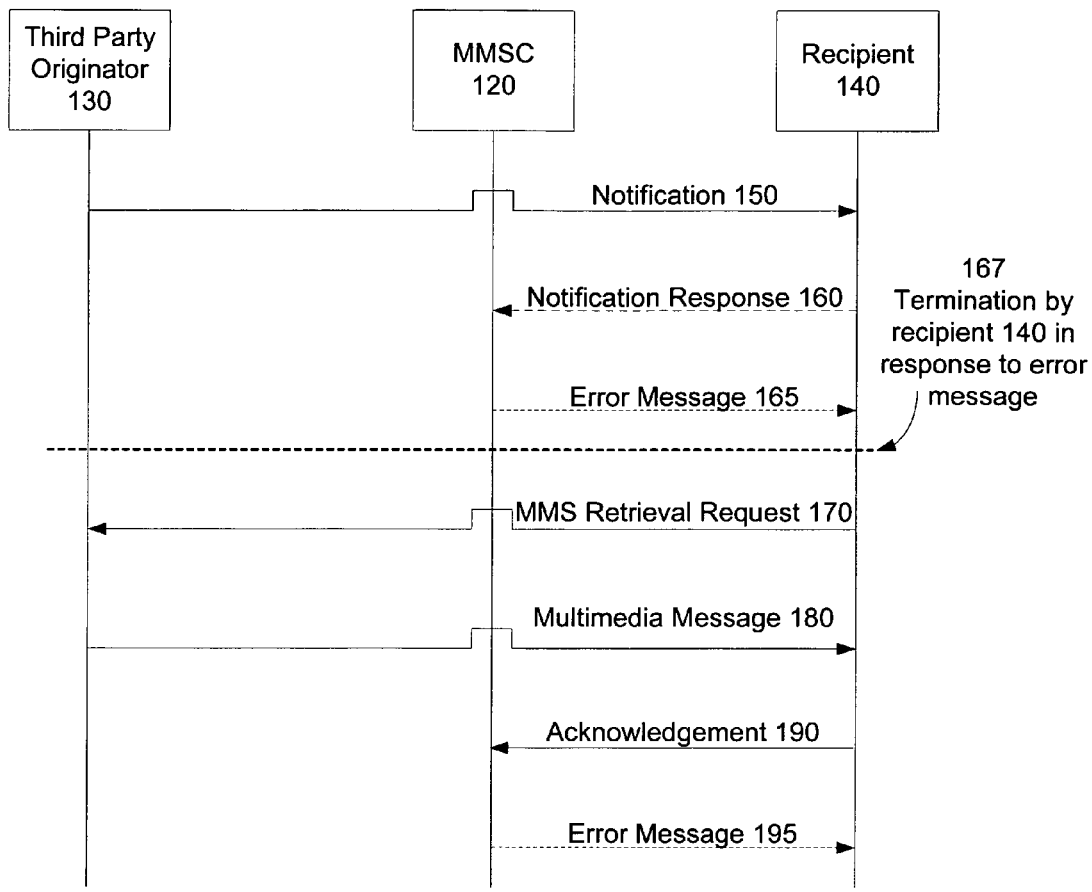
FIG. 1 is a messaging diagram of the third party interjection without correction.

FIG. 1 illustrates the messaging flow for a third party 130 originator without correction. The third party originator 130 sends a notification message 150 directly to the recipient 140 bypassing the MMSC 120. The notification 150 is a message that contains an address from which the multi-media message can be retrieved.

In one embodiment, the recipient 140 sends a notification response 160 to the notification 150. The response 160 from the designated recipient 140 acknowledges the notification 150, and may indicate the handset type and user ID. However, the response 160 is an atomic message, automatically sent to a pre-programmed MMSC 120 location. Since the MMSC 120 did not send the original message, it receives the response 160, without a corresponding original message. This leads to errors, and may lead to an error message 165 being sent by the MMSC 120 to the recipient 140. In some instances, this may lead to terminating the process 167 by the recipient 140, in response to the MMSC error message. Thus, the recipient 140 may terminate the process without having retrieved the multi-media message. In another embodiment, the recipient 140 may not send a notification response 160.

Alternately, the recipient 140 may simply ignore or handle the error message, and retrieve 170 the multi-media message from the third party 130, or the designated location indicated in the notification 150. The multi-media message is sent 180 to the recipient 140 in this case. However, the acknowledgement 190 sent by the recipient 140 is once again targeted at the MMSC 120, which was not involved in this transaction. Again, error messages 195 may ensue. Furthermore, the third party originator 130 did not receive acknowledgement that the multi-media message was successfully retrieved. This means that the third party originator 130 does not know whether the message must be re-sent because of errors. Also, billing often relies on such acknowledgement. Therefore, a solution that enables third parties to inject messages to recipients is needed.

Figure 2:
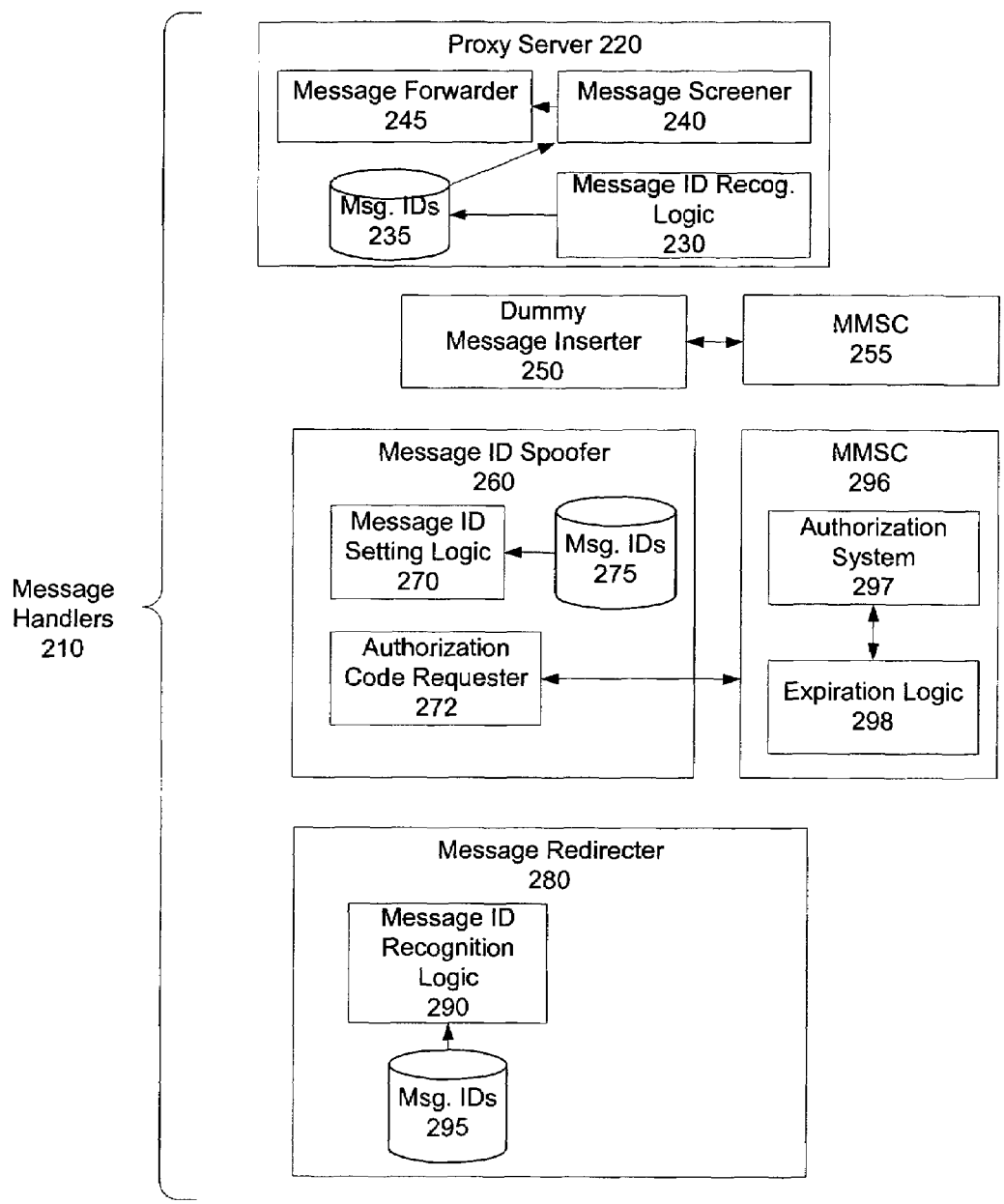
FIG. 2 is a block diagram of one embodiment of the third party injection mechanism.

FIG. 2 is a block diagram of one embodiment of the third party injection mechanism. Three different types of message handlers 210 are described, each providing an alternative solution to the message injection problem. In one embodiment, multiple handlers 210 may be implemented in a single system. In another embodiment, one handler 210 is implemented. The selection of handler 210 depends on various factors, as is described below. The message handlers 210 use the message ID, in one embodiment, to solve the problem described above.

One option is the use of a proxy server 220. A proxy server 220 may be part of the MMSC, or may be a separate server, between the MMSC and recipients.

The proxy server 220, in one embodiment, includes a message ID recognition logic 230. In one embodiment, the proxy server 220 receives notifications and messages from the third party originator, and forwards them to the recipient. The message ID recognition logic 230 stores the message ID of such notifications/messages in storage 235. This is subsequently used by message screener 240.

Since proxy server 220 is located between the MMSC and the recipient, when the recipient sends a message to the MMSC, the proxy server 220 receives the message. The message screener 240 in the proxy server 220 uses the message ID to determine whether the message was sent in response to something from third party originator. In one embodiment, if the original notification was received by the proxy server 220, the message IDs 235 stored are used for this recognition. In another embodiment, the original notification may bypass the proxy server 220. In that case, the message screener 240 may use the contents of the message to identify whether the message is in response to something from the third party originator and/or from the MMSC. For example, the message header may include information such as the originator of the message, etc. This header information, or the information in the content of the response, may be used to identify messages originated by the third party originator and/or the MMSC. The message screener 240 may screen for messages from the MMSC, redirecting all other messages to the third party originator. Alternatively, the message screener 240 may screen for messages from the third party originator, and direct all other messages to the MMSC. Alternative, the message screener 240 may screen for both, and identify the target as either the MMSC or the third party originator.

In one embodiment, if the message is in response to the third party originator, the message screener 240 removes the message. In one embodiment, the message forwarder 245 may forward the message on to the third party originator. Alternatively, the message may be discarded. If the message is not in response to a message by the third party originator, the proxy server 220 passes the message on to the MMSC. In this way, the MMSC only receives responses to messages from the MMSC. Any messages sent in response to a third party originator's notification or message is screened by the proxy server 220.

An alternative message handler 210 is the dummy message inserter 250. The dummy message inserter 250 may reside on the third party originator's system. In another embodiment, the dummy message inserter 250 may reside on the user's handset. The dummy message inserter 250 inserts a message into the MMSC 255, with the message ID of the message sent by the third party originator. The inserted message provides the message ID for the MMSC 255. Thus, in one embodiment, the MMSC 255 believes that it sent the original notification/message. This eliminates the error messages sent by the MMSC. However, the third party originator still does not receive the user's responses, with this solution.

An alternative message handler 210 is message ID spoofer 260. In one embodiment, the message ID spoofer 260 resides on the proxy server. In another embodiment, the message ID spoofer 260 resides on the third party originator. In another embodiment, the message ID spoofer 260 resides on the user's handset. The message ID spoofer 260 uses message ID setting logic 270 to set the message ID of the message sent by the third party originator. In one embodiment, the message IDs used by message ID setting logic 270 are obtained from message ID store 275.

In one embodiment, the message IDs correspond to message IDs used by the MMSC recently. In this way, the MMSC believes that any responses by the recipient to the messages from the third party originator—such as notification response and acknowledgement—are for one of its own notifications/messages. In one embodiment, the message ID is selected to be a message ID ignored or discarded by the MMSC. For example, an MMSC may have test message IDs, that are automatically discarded by the MMSC. Other message IDs may be discarded. For example, message IDs having a certain starting number combination not used by the MMSC may be automatically ignored.

In another embodiment, the message ID spoofer 260 includes an authorization code requester 272. The authorization code requester requests an authorization code from an MMSC 296. In one embodiment, the authorization code is requested before sending the notification/message to the recipient. An authorization system 297 in the MMSC 296 provides an authorization code to the message ID spoofer 260. In one embodiment, the authorization code is a used as part of the message ID for the notifications/messages sent. In another embodiment, the authorization code may be included in the notification/message in some other way, beyond using it as part of the message ID.

In one embodiment, this system may be used for bulk, or multiple, mails. In that instance, in one embodiment, the MMSC 296 may include expiration logic 298, to expire the authorization code after a period of time.

Another message handler 210 is an message redirecter 280 resident on the user's handset. The message redirecter 280 resides past the "sending mechanism" on the handset, and captures any messages bound for the MMSC. In one embodiment, the message redirecter 280 includes a message ID recognition logic 290, which identifies messages sent in response to a third party originator message. In one embodiment message ID recognition logic 290, using a message ID storage 295, determines whether the message ID is associated with the third party originated message. If so, the message is redirected from the pre-programmed MMSC to the third party originator.

Figure 3:
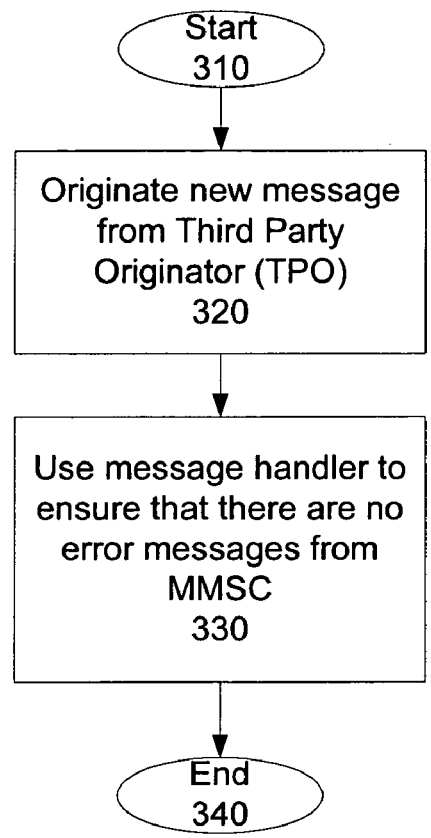
FIG. 3 is an overview flowchart of third party interjection.

FIG. 3 is an overview flowchart of third party interjection. The process starts at block 310. At block 320, a new message is originated from the third party originator. At block 320, a message handler is used to ensure that no error messages are received by the recipient, from the MMSC. In one embodiment, the proxy server may be used for this. Alternatively, the third party originator may include a dummy message injector or message ID spoofer. In another embodiment, the handset may include a message redirecter, a dummy message injector, or message ID spoofer. Alternative message handlers may be used, to ensure that no error messages are generated, and that the user properly receives the multimedia message originated by the third party originator. These message handlers may reside on the MMSC, a separate proxy server, a third party originator server, the user's handset, or on some other system. In one embodiment, the message handler may be split among two or more of the above locations.

Figure 4A:
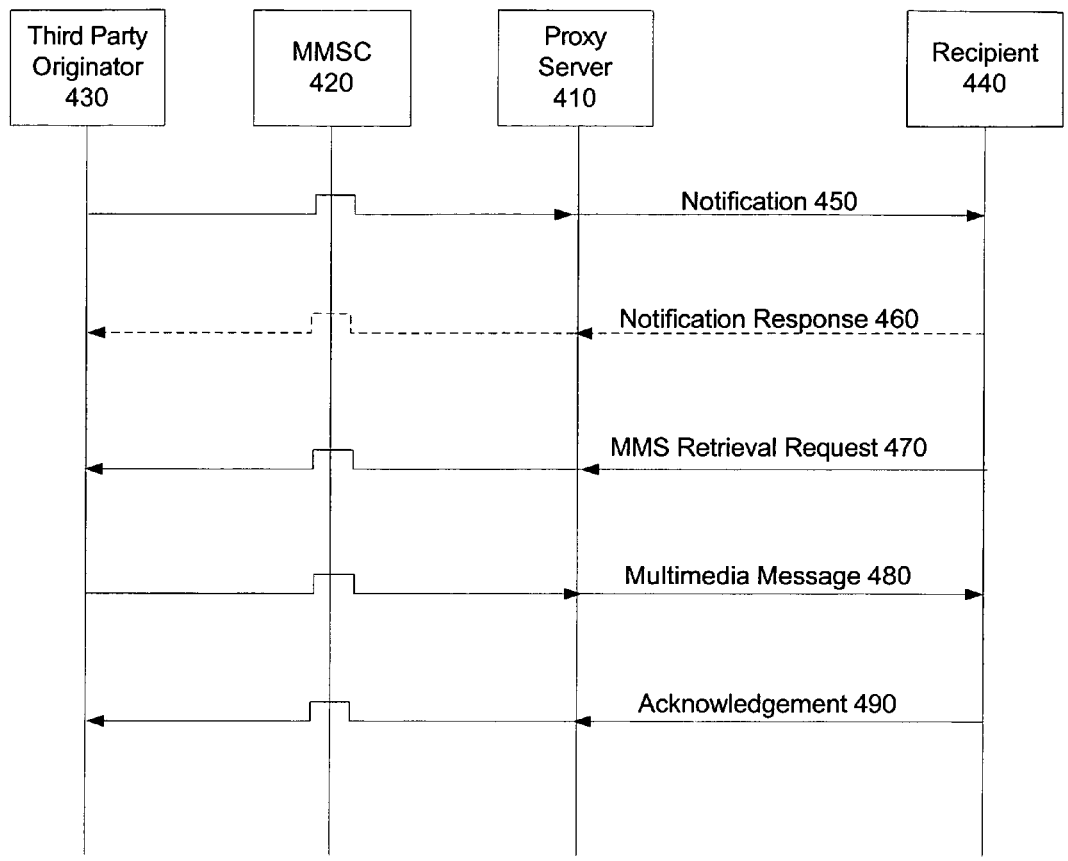
FIGS. 4A and 4B are messaging diagrams of two embodiments of third party interjection with proxy server correction.

FIG. 4A is a messaging diagram of one embodiment of third party interjection with proxy server correction. The third party originator 430 sends the notification 450 to the proxy server 410, bypassing the MMSC 420. The proxy server 410, adds the message ID to its list, and passes the notification 450 to the recipient 440.

In one embodiment, the recipient 440 sends an automatic notification response 460 to the MMSC. The address of the MMSC is generally pre-programmed into the recipient device 440. The pre-programmed MMSC address will resolve to the proxy server 410. Thus, proxy server 410 receives the notification response 460. In one embodiment, the proxy server 410 receives all notifications and messages for the MMSC 420, and passes all notifications/messages not directed to the third party originator 430 on to the MMSC 420. The notification response 460 is forwarded by the proxy server 410 to the third party originator 430, in one embodiment. In another embodiment, the proxy server 410 may discard the notification response 460.

The recipient 440, sends a retrieval request 470 to the third party originator 430, or to the destination designated in the notification 450. This may occur concurrently with, instead of, or after, sending the notification response 460. The multimedia message 480 is returned, as is known in the art. In one embodiment, the retrieval request 470, and responsive multi-media message 480 are routed through proxy server 410.

When the recipient 440 has successfully downloaded the multimedia message 480, the recipient 440 sends an acknowledgement 490. In one embodiment, the proxy server 410 intercepts the responses, and forwards it to the third party originator 430. In this way, the MMSC 420 is bypassed by all messages sent in response to third party originated notifications/messages. In one embodiment, the proxy server 410 sends the responses to the MMSC.

In one embodiment, for billing purposes, the proxy server 410 may send a "billing message" to the MMSC 420, indicating that a third party originated message was received by the recipient 440.

Figure 4B:
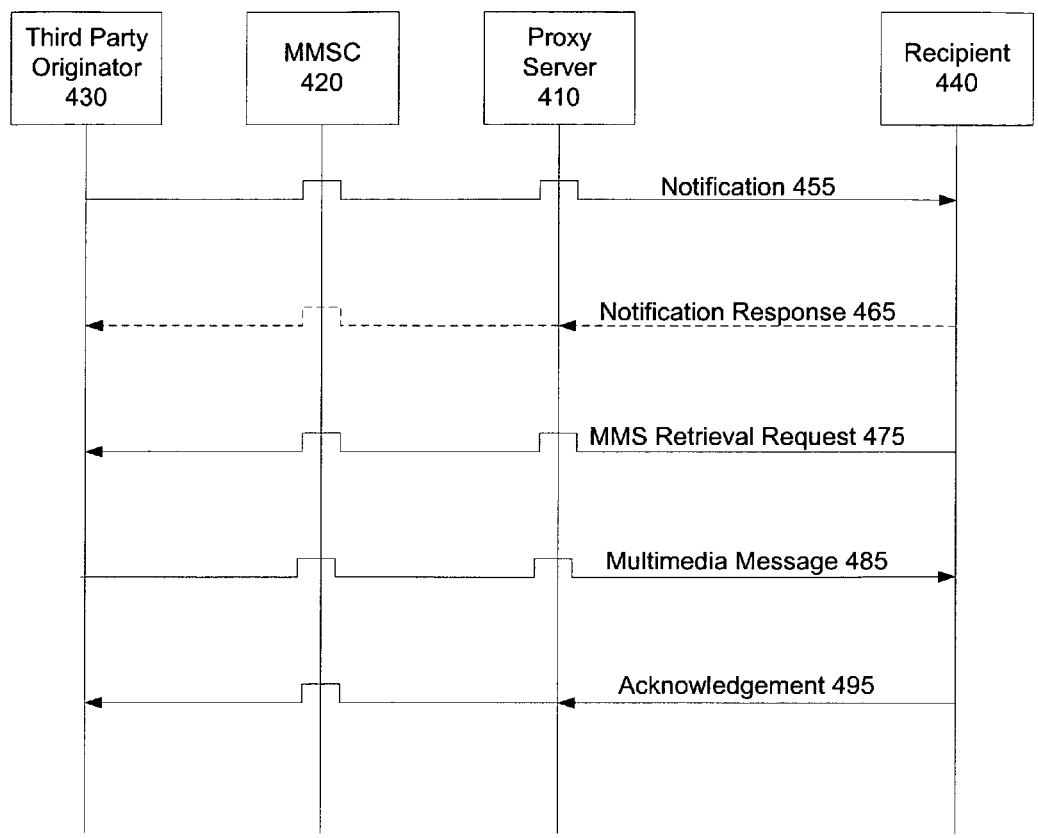

FIG. 4B is similar to FIG. 4A, with the difference being that the notification message 455 is sent directly to the recipient 440, without passing through the proxy server 410. This means that the proxy server 410 does not know the message ID of the message sent by the third party originator 430.

In one embodiment, the recipient 440 sends the notification response 465, which is intercepted by the proxy server 410. The proxy server 410 uses the header or contents of the notification response 465 to determine whether the originator was the third party originator 430 or the MMSC 420. In another embodiment, if the recipient does not send a notification response 465, the acknowledgement 495 may be used by the proxy server 410 to determine whether the message was originated by the MMSC or the third party originator 430.

The proxy server 410, in one embodiment, receives all messages for the MMSC 420, and passes messages and notifications not directed to the third party originator 430 to the MMSC 420. For messages from the third party originator 430, the message ID is added to the proxy server's 410 list of message IDs, and the notification response 465 is handled as described above. The remainder of the process is the same as described above with respect to FIG. 4A. Alternatively, the retrieval message 475 and multi-media message 485 may be communicated between the third party originator 430, or designated source, and the recipient 440 without going through proxy server 410.

Figure 5:
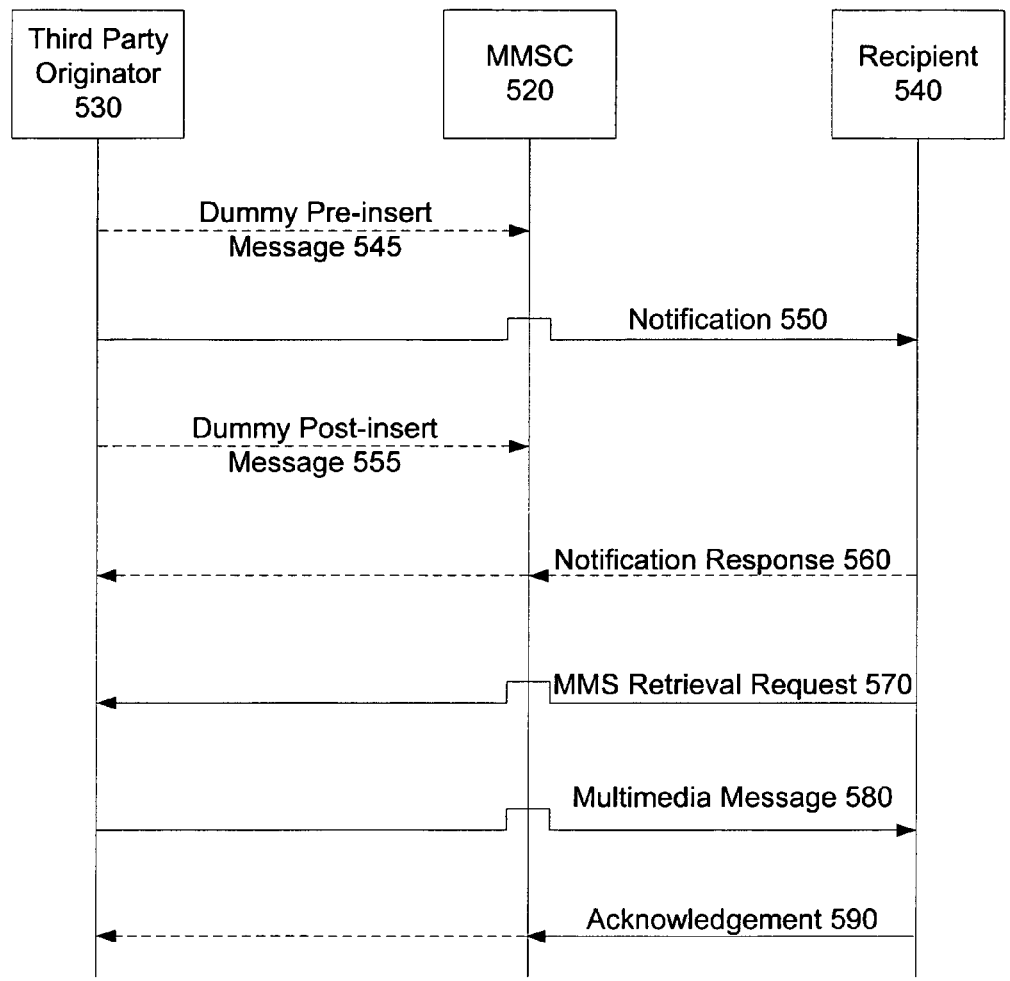
FIG. 5 is a messaging diagram of one embodiment of third party interjection with dummy message interjection.

FIG. 5 is a messaging diagram of one embodiment of third party interjection with dummy message interjection. In one embodiment, the third party originator 530 sends a pre-insertion message 545 to the MMSC 520, prior to sending a notification to a recipient. The pre-insertion message 545, in one embodiment, requests an authorization code from the MMSC 520. In another embodiment, no pre-insertion message 545 is sent. The third party originator 530 sends a notification 550 to the recipient 540, bypassing MMSC 520. In one embodiment, concurrently, or within a short time period of sending the notification 550, the third party originator 530 or the user's handset inserts a post-insertion dummy message 555 into the MMSC 520.

In one embodiment, the dummy message 545, 555 is sent without an explicit mechanism in the MMSC 520. In another embodiment, the MMSC 520 has a mechanism to permit such dummy messages. In one embodiment, the dummy message 545, 555 may define a standard or protocol for notifying an MMSC that a third party sent a direct message to a recipient 540. For example, the dummy message 545, 555 may include: the message ID of the message sent, the exact time the message was sent, the recipient(s) IDs, and whether the third party originator 530 would like to receive the acknowledgements. Alternative formats for the dummy message 545, 555 may be used.

Thus, when the recipient 540 responds to the MMSC 520 with the notification response 560 or acknowledgement 590, the MMSC 520 does not send an error message. In one embodiment, the MMSC 520 believes that it sent the original message, due to the insertion of the dummy message 545, 555. Therefore, the MMSC 520 simply handles the notification response 560 and acknowledgement 590 as it would handle any standard response.

In one embodiment, the dummy message 545, 555 is an extension of the MMSC standard, and is recognized by the MMSC. In that case, the MMSC 520 is aware that the third party originator 530 sent the original message. In one embodiment, in that instance, the MMSC 520 may forward the notification response 560 and/or acknowledgement 590 to the third party originator 530.

The recipient 540 sends the message retrieval request 570 directly to the location designated in the notification 550. The multimedia message 580 is returned from the same location. Once the multimedia message 580 is successfully received, the recipient 540 sends an acknowledgement 590 to the MMSC 520. As discussed above with respect to the notification response 560, the MMSC may handle the acknowledgement 590 in various ways.

The advantage of this system is to reduce the load on the MMSC 520 since the notifications, and multimedia messages do not go through the MMSC 520. This is especially advantageous for multicasting, where the third party originator 530 sends many identical messages to many recipients 540. By simply inserting the dummy message 545, 555, the MMSC 520 has significantly less load on it, and uses significantly less bandwidth. However, since the MMSC 520 still receives the notification response 550 and acknowledgement 590, the MMSC 520 can continue tracking the recipient's 540 usage.

Figure 6:
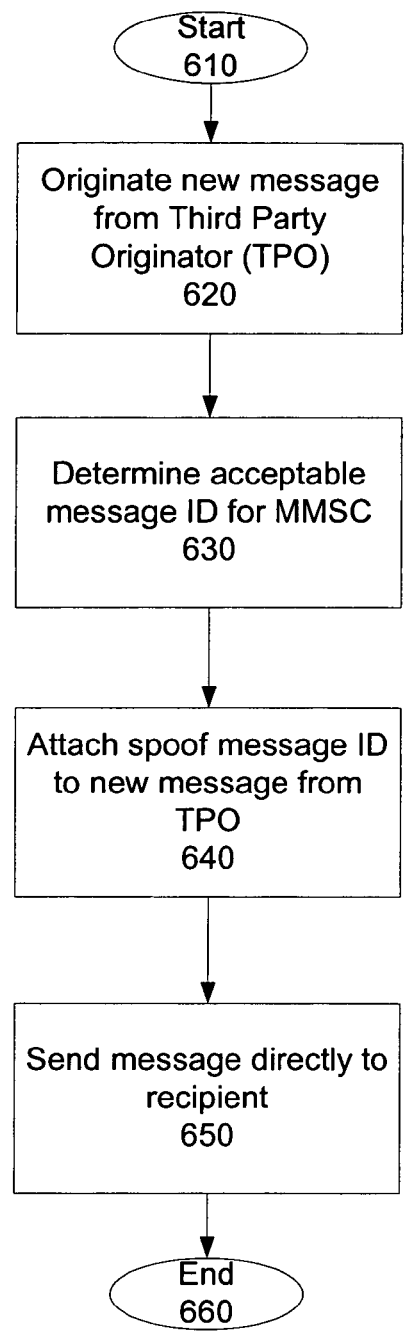
FIG. 6 is a flowchart of one embodiment of third party interjection with message ID spoofing.

FIG. 6 is a flowchart of one embodiment of third party interjection with message ID spoofing. The process starts at block 610.

At block 620, a new message is originated by the third party originator. At block 630, the process determines an acceptable message ID for the MMSC with which the recipient is associated. An acceptable message ID may be a message ID that the MMSC ignores, or a message ID that corresponds to a message recently sent by the MMSC. An alternative acceptable message ID may be a message ID that will be discarded or ignored by the MMSC.

In one embodiment, the MMSC standard may be extended to include a range of message IDs that may be used by third party originators. In one embodiment, the third party originator may negotiate a particular set of message IDs with the MMSC. Thus, when the MMSC receives a response with the spoof message ID, the MMSC is aware that the message was sent by a third party originator. In one embodiment, the MMSC may be aware of the identity of the particular third party originator who sent the message. In that instance, the MMSC may forward the acknowledgement messages to the third party originator.

At block 640, the spoof message ID is attached to the new message from the third party originator. At block 650, the message is sent directly to the recipient by the third party originator. The process then ends at block 660. Note that in this case, the third party originator will not receive any acknowledgements from the recipient. However, this may be preferred.

Figures 7A, 7B:
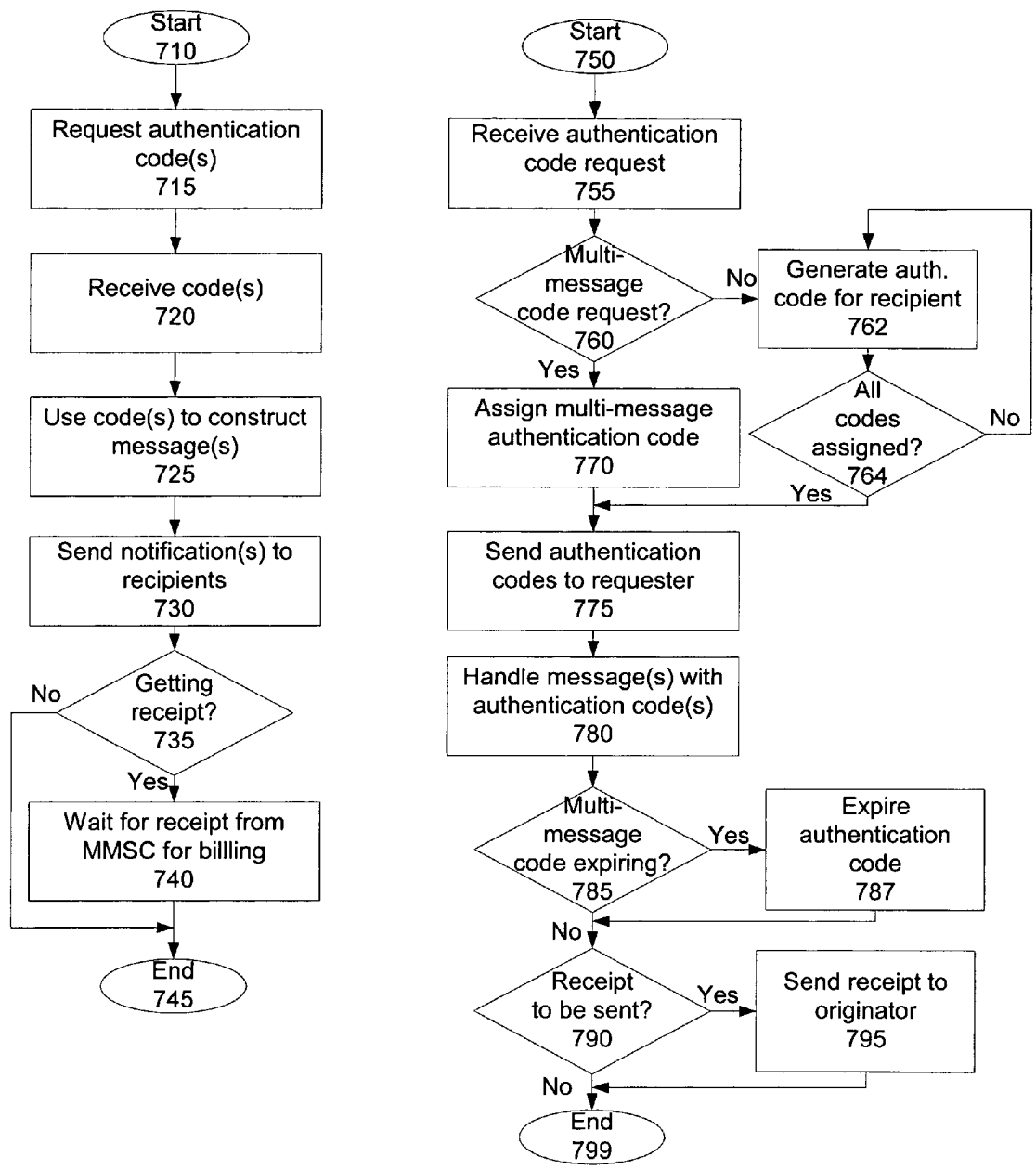
FIG. 7A is a flowchart of one embodiment of using authentication codes, from the third party originator's perspective.
FIG. 7B is a flowchart of one embodiment of using authentication codes, from the MMSC's perspective.

FIG. 7A is a flowchart of one embodiment of using authentication codes, from the perspective of a third party originator. The process starts at block 710. At block 715, the third party originator requests an authentication code. In one embodiment, the third party originator may request a single authentication code for multiple notifications/messages. In one embodiment, the third party originator may bundle requests, or make multiple requests for a multiple recipient notifications/messages. At block 720, the codes are received from the MMSC.

At block 725, the third party originator uses the code(s) to construct messages to be sent directly to recipients. In one embodiment, the authentication code may be a Message ID for the notifications/messages. Alternatively, the authentication code may be included in another form within the notifications/messages sent to recipients. The third party originator then sends the notifications/messages to the recipients, at block 730. As described above, the recipients retrieve the multi-media messages in response to the notification.

At block 735, the process determines whether the MMSC will send a receipt. In one embodiment, the authentication code received from the MMSC indicates whether a receipt will be sent. In one embodiment, the authentication code request indicates whether the third party originator wants a receipt. If the third party originator wants a receipt, and the MMSC is willing to provide the receipt, the process continues to block 740, and waits for a receipt. In one embodiment, the receipt is used to bill the message originator and/or message recipient for the message. In one embodiment, the receipt is a cumulative receipt, as will be described below. The process then ends at block 745.

FIG. 7B illustrates the authentication code-based system, from the perspective of an MMSC. The process starts at block 750. At block 755, an authentication code request is received from a third party originator.

At block 760, the process determines whether the request is a multi-message authentication code request. A multi-message authentication request is a single request that requests a single code for multiple notifications/messages. For example, a third party originator who broadcasts the same notification/message to multiple recipients served by an MMSC would, in one embodiment, be able to request a single authentication code to be used for all, or a subset of, the notifications/messages.

If the MMSC provides multi-message authentication, the process, in response to a multi-message code request continues to block 770, and generates a single multi-message authentication code. In one embodiment, the authentication code may be a message ID to be used for the notifications/messages. In one embodiment, a multi-message ID may be the a set of digits of the message ID, with the third party originator adding an individualizing "extension" to the multi-message code. Thus, for example, the multi-message authentication code may be ABC, with the indication to the third party originator that the actual message IDs used should be ABCX, where X provides individualization between the recipients. The process then continues to block 775.

If the request is not a multi-message code request, the process continues to block 762. At block 762, an authentication code is generated for a recipient. In on embodiment, the recipient may be an identified recipient. Alternatively, the recipient may be unidentified. The process, at block 764 tests whether codes have been assigned to all of the requests. If not, the process returns to block 762, to assign the next code. Otherwise, the process continues to block 775.

At block 775, the authentication codes are sent to the requester. In one embodiment, if multiple codes are sent, they may be sent in a batch. Alternatively, each individual code is sent separately.

At block 780, the responses with the authentication codes are handled. While this is shown in flowchart form, these actions may be discontinuous. That is, the present process does not wait for the responses to be handled, but rather handles the responses as received. The respnses, from recipients, sent to MMSC in response to a third party originated notification/message, are recognized based on the authentication code. The authentication code may be part of, or the entirety of, the message ID, or may be incorporated in some other way into the message header. These responses handled in various ways. In one embodiment, the MMSC may simply discard such responses. In one embodiment, these responses may be forwarded to the third party originator. In one embodiment, these responses may be handled conventionally for billing purposes. These responses may be bundled, and forwarded in a batch mode to the third party originator.

At block 785, the process determines whether the multi-message code expires. The multi-message codes, one embodiment, are available for responses for a limited time. In one embodiment, the codes expire after the set number of recipients have accessed the multi-media message. In one embodiment, the number of recipients is indicated in the original multi-message authentication code request. In one embodiment the multi-message code expires after a set period of time, such as an hour, a day, a week, a month, etc. In one embodiment, the multi-message code may never expire. If the multi-media code is expiring, the process continues to block 787, and expires the authentication code. Any responses using the expired authentication code will not be handled.

At block 790, the process determines whether a receipt, or summary, should be sent to the third party originator. In one embodiment, after a response is handled, or after an expiry, the process determines whether to send a receipt, summary, or other indication of the recipient's response(s) to the third party originator. If so, at block 795, the receipt is sent, and the process then terminates. Otherwise, the process terminates. Note that while the above process is shown as a flowchart it is neither continuous nor linear, in one embodiment. For example, the process does not wait for a message to handle, as in block 780, but rather handles responses as received. Similarly, the process does not repeatedly test for multi-message code expiration, as in block 785. Rather, the process tests when appropriate. For a multi-message code that expires after a set number of multi-media message retrievals, the process tests after each retrieval. For a multi-message code that expires after a period of time, the process sets the expiration time, and doesn't test at all. That is, in one embodiment, the process associates an expiry date with the multi-message authentication code, when it is created. Similarly, while the present processes are generally described linearly, they may be performed in a different order.

The above system described various ways of using message handlers to ensure that a third party originator can successfully send notifications/messages to a recipient, without going through an MMSC. These various implementations of message handlers are exemplary. Alterative message handling implementations may be used.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system comprising:
    a third party originator to send a notification message of a multimedia message to a recipient without the use of a multi-media messaging service center (MMSC); and
    a message handler to manage a response sent by the recipient to the MMSC, wherein the message handler comprises a proxy server to redirect the response sent by the recipient to the MMSC; and wherein the proxy server comprises:
        a message ID recognition logic to identify notification message originating from the third party originator; and
        a message screener to screen the response directed to the MMSC by the recipient, and identify the response sent in response to the third party originator.

2. The system of claim 1, wherein the proxy server further comprises:
    a message forwarder to forward the response directed to the MMSC by the recipient in response to the third party originator.

3. A system comprising:
    a message originator to send a notification message including retrieving information of a multimedia message directly to a recipient's device without the use of a multi-media messaging service center (MMSC); and
    a message handler to manage a response sent by the recipient's device to the MMSC, wherein the message handler comprises a message redirector resident on the recipient's device, the message redirector identifying the header of the response to determine that the response is for the originator in response to the notification message, and redirecting the response to the originator.

4. A system comprising:
    a message handler to ensure that a response directed to multi-media messaging service center (MMSC) in response to a notification message sent by a third party originator directly to a recipient are managed without triggering an error message in the MMSC, wherein the message handler comprises a proxy server to redirect the response sent by the recipient to the MMSC; and wherein the proxy server comprises:
        a message ID recognition logic to identify a header of the notification message originating from the third party originator; and
        a message screener to screen the response directed to the MMSC by the recipient, and identify the response sent in response to the third party originator.

* * * * *